United States Patent
Ushiki

[19]

[11] Patent Number: 6,006,203
[45] Date of Patent: Dec. 21, 1999

[54] ORDER CONTROL APPARATUS CAPABLE OF REDUCING INPUT OPERATION BY AN INPUT UNIT

[75] Inventor: Hirofumi Ushiki, Tokyo, Japan

[73] Assignee: NEC Corporation, Tokyo, Japan

[21] Appl. No.: 08/630,690

[22] Filed: Apr. 12, 1996

[30] Foreign Application Priority Data

Apr. 14, 1995 [JP] Japan .................................. 7-089434

[51] Int. Cl.[6] .................................................. G06F 153/00
[52] U.S. Cl. .................. 705/29; 364/468.13; 364/468.14
[58] Field of Search .............. 705/7, 8, 29; 364/468.01, 364/468.05, 468.06, 468.13, 468.14

[56] References Cited

U.S. PATENT DOCUMENTS

| | | | |
|---|---|---|---|
| 4,459,663 | 7/1984 | Dye | 705/29 |
| 4,591,983 | 5/1986 | Bennett et al. | 705/29 |
| 4,847,761 | 7/1989 | Ferriter et al. | 705/29 |
| 5,101,352 | 3/1992 | Rembert | 705/8 |
| 5,119,307 | 6/1992 | Blaha et al. | 364/468.14 |
| 5,197,001 | 3/1993 | Mukherjee | 705/29 |
| 5,210,686 | 5/1993 | Jernigan | 705/29 |
| 5,231,567 | 7/1993 | Matoba et al. | 364/468.06 |
| 5,295,067 | 3/1994 | Cho et al. | 705/29 |
| 5,307,260 | 4/1994 | Watanabe et al. | 705/29 |
| 5,479,343 | 12/1995 | Matoba et al. | 364/468.13 |
| 5,515,269 | 5/1996 | Willis et al. | 705/29 |

FOREIGN PATENT DOCUMENTS

| | | |
|---|---|---|
| 62-251050 | 10/1987 | Japan . |
| 4-30953 | 2/1992 | Japan . |
| 5-342241 | 12/1993 | Japan . |

*Primary Examiner*—Eric W. Stamber
*Attorney, Agent, or Firm*—Young & Thompson

[57] ABSTRACT

In an order control apparatus including a first memory area (1) for storing item information corresponding to item numbers, a second memory area (2) for storing structure information corresponding to the item numbers, and a third memory area (3), a control section (4) stores in the third memory area an order number and an ordered item number received as order information from an input unit (7). Simultaneously, the control section: (i) reads from the first memory area the item information corresponding to the ordered item number, and stores the readout item information in the third memory area; and (ii) reads from the second memory area the structure information corresponding to the ordered item number, and stores the readout structure information in the third memory area with the order number added to the structure information as a parent order number. Alternatively, the structure information with the parent order number associated with the order number may be acquired by searching the contents of the third memory area. An order developing section (5) develops the item information and the structure information stored in the third memory area into manufacture instruction information.

10 Claims, 4 Drawing Sheets

| PRODUCTION ORDER NUMBER | ORDER NUMBER | ITEM NUMBER | PARENT ORDER NUMBER | NAME | LEAD TIME | UNIT AMOUNT | REQUISITE AMOUNT | DUE DATE | SCHEDULED START DATE |
|---|---|---|---|---|---|---|---|---|---|
| 100 | 123456 | A | — | AUTOMOBILE | 15 DAYS | 1 | | | |
| 100 | 123457 | B | 123456 | HANDLE | | 1 | | | |
| 100 | 123458 | C | 123456 | TIRE | | 4 | | | |
| 100 | 123459 | D | 123456 | | | | | | |
| 100 | 123460 | E | 123456 | | | | | | ... |
| ... | ... | ... | ... | ... | ... | ... | ... | ... | |

ORDER CONTROL APPARATUS CAPABLE OF REDUCING INPUT OPERATION BY AN INPUT UNIT

BACKGROUND OF THE INVENTION

This invention relates to an order control apparatus for use in a production control system and, in particular, to an order control apparatus for use in developing order information, relating to an ordered product, into manufacture instruction information.

A production control system utilizing a production order number and another production control system based on material requirement planning (abbreviated to MRP) are well known in the art. For example, such systems are disclosed in Japanese Patent Prepublications (A) Nos. 30953/1992, 251050/1987, and 342241/1993.

This invention Is most suitable for use in the production control system utilizing the production order number. However, this invention it also applicable to the MRP-based production control system, as will later be described.

A conventional order control apparatus for use in the production control system utilizing a production order number comprises an Item information memory area, a structure information memory area, and an order memory area. The item information memory area stores, in correspondence to each of the item numbers representative of products items, each item information representative of a manufacturing feature of each of the products. Likewise, the structure information memory area stores, in correspondence to each of the item numbers, each structure information relating to component parts of each of the products. The order memory area stores, upon receiving an order number representative of an ordered product and an ordered item number representative of an item of the ordered product, and stores the information as order information.

More specifically, the item information memory area stores, in correspondence to each of the item numbers, the lead time of each of the products and the name of each of the products as item information. The lead time is equivalent in meaning to a time interval required to manufacture each product. The structure information memory area stores, as structure information, component item numbers representative of component items of the component parts of each of the products, and unit amounts of the component parts of each of the products in correspondence to each parent item number. The unit amount is equivalent in meaning to the number of each of the component items required in manufacturing a single product in the manner which will become clear as the description proceeds.

The above-mentioned conventional order control apparatus stores in the order memory area the order information received from an input unit and manages only the order information independently of the item information and the structure information.

Thus, the order information is not related to the item information and the structure information corresponding thereto. Every time new order information is supplied from the input unit, the order control apparatus must request that the input unit provide the item information and the structure information corresponding to the new order information. In this arrangement, it is necessary to input the item information and the structure information by an operator by using the input unit.

After the item information and the structure information are stored in the item information memory area and the structure information memory area, respectively, the order control apparatus stores the order information in the order memory area and makes an order developing section execute calculations as required. The order developing section thereby produces manufacture instruction information.

In the above-described conventional order control apparatus, the order information is not related to the item information and the structure information corresponding thereto. For example, in case of an individual production order in which a product specification is determined by the order, it is necessary for the input unit to re-enter the item information and the structure information so as to meet the specification determined by each order.

SUMMARY OF THE INVENTION

It is therefore an object of this invention to provide an order control apparatus which is capable of reducing input operations of item information and structure information by an input unit.

It is another object of this invention to provide an order control apparatus of the type described, in which an input unit is not always required to input item information and structure information.

According to an aspect of this invention, there is provided an order control apparatus comprising: an item information memory area for preliminarily storing, in correspondence to each of item numbers representative of items of products, item information representative of a manufacturing feature of each of the products; a structure information memory area for preliminarily storing, in correspondence to each of the item numbers, structure information relating to component parts of each of the products; an order/structure memory area; a control section connected to the item information memory area, the structure information memory area, and the order/structure memory area. Supplied as order information, is an order number representative of an ordered product and an ordered item number representative of an item of the ordered product for storing in the order/structure memory area as a current order number and a current ordered item number. The control section furthermore reads, as corresponding item information from the item information memory area, the item information corresponding to the item number associated with the ordered item number and stores the corresponding item information in the order/structure memory area as current item information. The control section furthermore reads, as corresponding structure information from the structure information memory area, the structure information corresponding to the item number associated with the ordered item number and stores the corresponding structure information in the order/structure memory area as current structure information with the order number added to the current structure information as a parent order number. Additionally, this aspect of the invention includes an order developing section connected to the order/structure memory area for developing the current item information and the current structure information into manufacture instruction information.

According to another aspect of this invention, there is provided an order control apparatus comprising: an item information memory area for preliminarily storing, in correspondence to each of item numbers representing products, the lead time of each of the products as item information representative of a manufacturing feature of each of the products; a structure information memory area for preliminarily storing, as structure information relating to component parts of each of the products, component item numbers representing component parts of each of the products and required unit amounts of the component parts in correspondence to each parent item number. This aspect of the invention further includes an order/structure memory area; a control section connected to the item information memory area, the structure information memory area, and the order/structure memory area and supplied as order information with an order number representative of an ordered product and with an ordered item number representative of an item of the ordered product for storing the order number and the ordered item number in the order/structure memory area as a current order number and a current ordered item number. The control section furthermore reads, as a corresponding lead time from the item information memory area, the lead time corresponding to the item number coincident with the ordered item number and stores the corresponding lead time in the order/structure memory area as a current lead time. The control section furthermore reads, as corresponding component item numbers and corresponding unit amounts from the structure information memory area, the component item numbers and the unit amounts corresponding to the item number associated with the ordered item number and stores the corresponding component item numbers and the corresponding unit amounts in the order/structure memory area as current component item numbers and current unit amounts with the order number added to the current component item numbers and the current unit amounts as a parent order number. The invention additionally comprises an order developing section connected to the order/structure memory area for developing the current lead time and the current unit amounts into a requisite amount, a due date, and a scheduled start date for each of the component items represented by the current component item numbers and stores the requisite amount, the due date, and the scheduled start date for each of the component items and produces the requisite amount, the due date, and the scheduled start date for each of the component items as manufacture instruction information.

BRIEF DESCRIPTION OF THE DRAWING

FIG. 4 is a view for use in describing information stored in an order/structure memory area of the order control apparatus illustrated in FIG. 1.

DESCRIPTION OF THE PREFERRED EMBODIMENT

Description will now be made as regards an embodiment of this invention with reference to the drawings.

Figure 1:
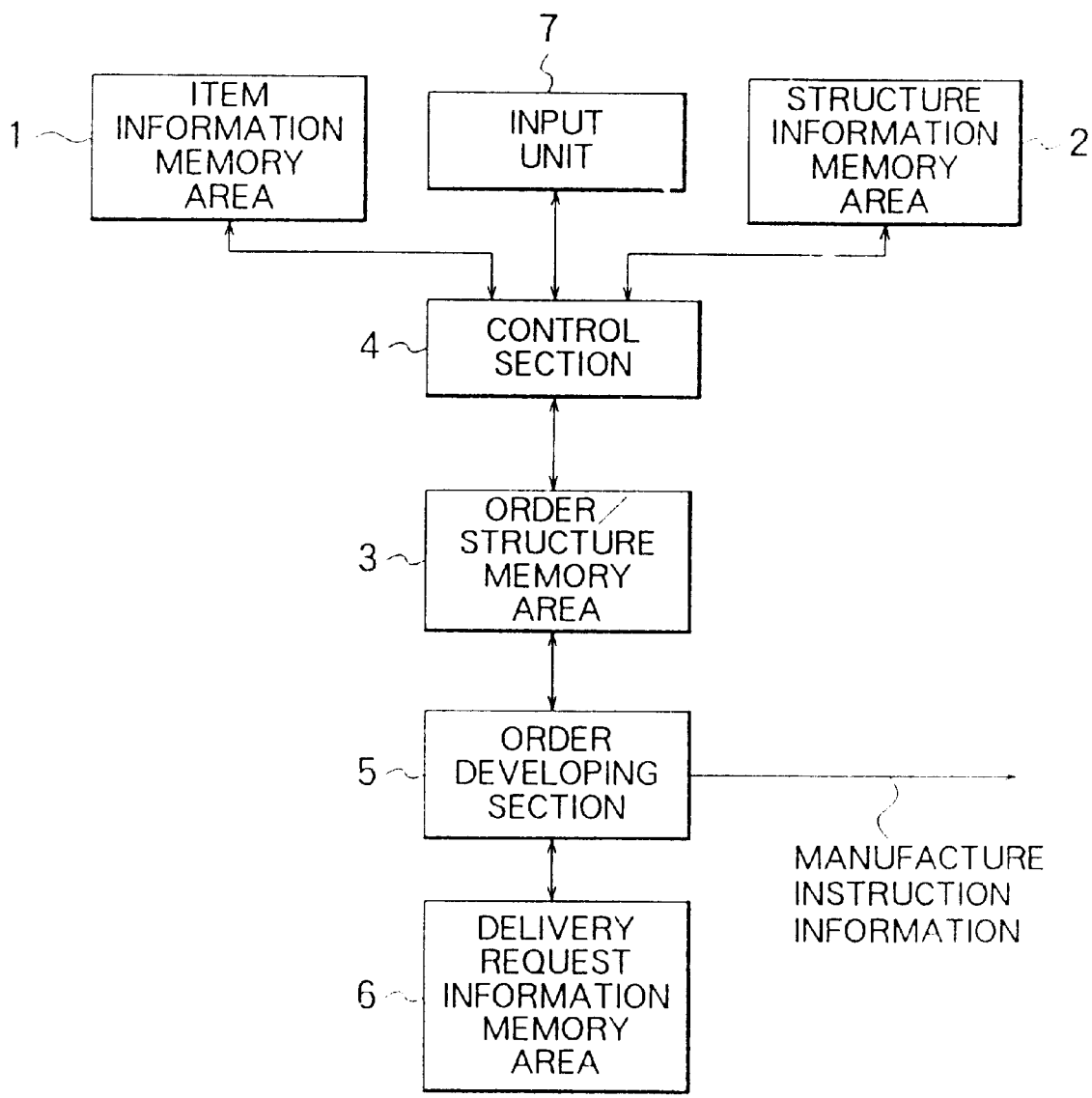
FIG. 1 is a block diagram of an order control apparatus according to an embodiment of this invention.

Referring to FIG. 1, an order control apparatus according to one embodiment of this invention comprises an item information memory area 1, a structure information memory area 2, an order/structure memory area 3, a control section 4 connected to the item information memory area 1, the structure information memory area 2, and the order/structure memory area 3, and an order developing section 5 connected to the order/structure memory area 3. A delivery request information memory area 6 is connected to the order developing section 5. An input unit 7 is connected to the control section 4.

Figure 2:
FIG. 2 is a view for use in describing item Information stored in an item information memory area of the order control apparatus illustrated in FIG. 1.

Referring to FIG. 2, the item information memory area 1 preliminarily stores, in association with each of item numbers representing product items, the name of each of the products and the product lead time, as information representative of a manufacturing feature of each of the products. For example, the item information memory area 1 stores "AUTOMOBILE" and "15 DAYS" as the name and as the lead time, respectively, in correspondence to item number A. The item information memory area 1 stores "HANDLE" and "1 DAY" as the name and as the lead time, respectively, in correspondence to item number B. Likewise, the item number memory area 1 stores "TIRE" and "1 DAY" as the name and as the lead time, respectively, in correspondence to item number C.

Figure 3:
FIG. 3 is a view for use in describing structure information stored in a structure information memory area of the order control apparatus illustrated in FIG. 1.

Referring to FIG. 3, the structure information memory area 2 preliminarily stores, as component item numbers B, C, . . . structure information relating to component parts of each the FIG. 2 products. Area 2 also stores unit amounts 1, 4, . . . of the component parts required by each of the FIG. 2 products. As described above, the name of the component item represented by the component item number B is "HANDLE". The unit amount of the handle is equal to one. The name of the component item represented by the component item number C is "TIRE" and the unit amount of the tire is equal to four.

FIG. 4 shows the order/structure memory area 3.

Figure 5:
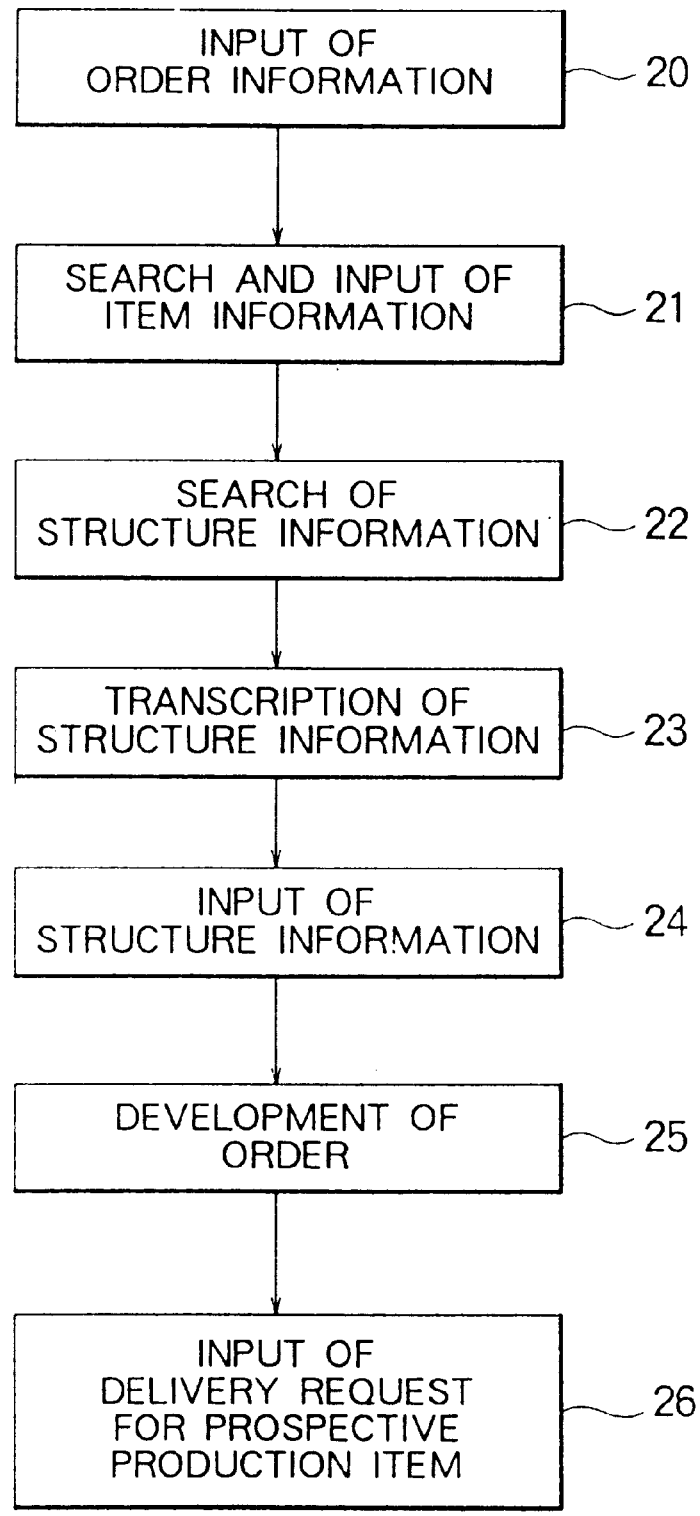
FIG. 5 in a flow chart for use In describing an operation of the order control apparatus illustrated in FIG. 1.

FIG. 5 shows a flow chart for describing an operation of the order control apparatus illustrated in FIG. 1.

Referring to FIGS. 1 to 5, the input unit 7 inputs a production order number 100 (FIG. 4), an order number 123456 (FIG. 4) representative of an ordered product, and an ordered item number A (FIG. 4) representative of an item of the ordered product to the control section 4 as order information. Upon receiving the production order number 100, the order number 123456, and the ordered item number A as the order information from the input unit 7, the control section 4 stores the production order number 100, the order number 123456, and the ordered item number A in the order/structure memory area 3. In this step, the order number 123456 and the ordered item number A are stored in the order/structure memory area 3 as a current order number and a current ordered item number (step 20 in FIG. 5).

The control section 4 furthermore reads from the item information memory area 1, the lead time of 15 days corresponding to the item number associated with the ordered item number A and stores the corresponding lead time in the order/structure memory area 3 as a current lead time. Simultaneously, the control section 4 reads from the item information memory area 1 the name of "AUTOMOBILE" corresponding to the item number associated with the ordered item number A and stores the name in the order/structure memory area 3 (step 21).

When the corresponding lead time is not present in the item information memory area 1, the control section 4 requests that the input unit 7 provides the corresponding lead time to the control section 4. Upon receiving the corresponding lead time from the input unit 7, as received lead time, the control section 4 stores the received lead time as the current lead time in the order/structure memory area 3 and the received lead time and the ordered item number in the item Information memory area 1 (step 21).

The control section 4 furthermore reads, as corresponding component item numbers and corresponding unit amounts from the structure information memory area 2, the component item numbers B and C and the unit amounts 1 and 4 corresponding to the item number associated with the ordered item number A, and stores the corresponding component item numbers and the corresponding unit amounts in the order/structure memory area 3 as current component item numbers and current unit amounts with the order number 123456 added to the current component item numbers and the current unit amounts as a parent order number. Simultaneously, the control section 4 reads from the item information memory area 1 the names "HANDLE" and "TIRE" corresponding to the item numbers associated with the component item numbers B and C. The names thus read are also stored in the order/structure memory area 3 (step 22).

When the corresponding component item numbers and the corresponding unit amounts are not present in the structure information memory area 2, the control section 4 searches, as the corresponding component item numbers and the corresponding unit amounts by using the order number 123456 as a search key, previous component item numbers and previous unit amounts previously stored in the order/structure memory area 3 with the parent order number associated with the order number 123456 added to the previous component item numbers and the previous unit amounts. The control section 4 transcribes the corresponding component item numbers and the corresponding unit amounts in the order/structure memory area 3 as the current component item numbers and the current unit amounts with the parent order number associated with the order number 123456 added to the current component item numbers and the current unit amounts (step 23).

Although the step 23 is described above as being carried out subsequently to the step 22 in FIG. 5, the step 23 may alternatively be carried out subsequently to the step 21 and instead of the step 22. In this case, whether or not the corresponding component item numbers and the corresponding unit amounts are present in the structure information memory area 2, the control section 4 searches, as the corresponding component item numbers and the corresponding unit amounts by using the order number 123456 as the search key, previous component item numbers and previous unit amounts previously stored in the order/structure memory area 3 with the parent order number associated with the order number 123456 added to the previous component item numbers and the previous unit amounts. Thereafter, the control section 4 transcribes the corresponding component item numbers and the corresponding unit amounts in the order/structure memory area 3 as the current component item numbers and the current unit amounts with the parent order number coincident with the order number 123456 added to the current component item numbers and the current unit amounts, like in the step 23.

When the corresponding component item numbers and the corresponding unit amounts are not present in the structure information memory area 3, the control section 4 requests that the input unit 7 provide the corresponding component item numbers and the corresponding unit amounts to the control section 4. Upon receiving the corresponding component item numbers and the corresponding unit amounts from the input unit 7 as received component item numbers and received unit amounts, the control section 4 stores the received component item numbers and the received unit amounts as the current component item numbers and the current unit amounts in the order/structure memory area 3 with the order number 123456 added to the current component item numbers and the current unit amounts as the parent order number (step 24).

The order developing section 5 develops the current lead time and the current unit amounts into a requisite amount, a due date, and a scheduled start date for each of the component items represented by the current component item numbers. The order developing section 5 stores the requisite amount, the due date, and the scheduled start date for each of the component items and produces the requisite amount, the due date, and the scheduled start date for each of the component items as manufacture instruction information (step 25).

In presence of a prospective production item (namely, the item managed or controlled by the MRP), the order developing section 5 supplies the delivery request information memory area 6 with delivery request information (including, for example, an item number, a requested delivery date, and a requested number) for the prospective production item (step 26).

As described above, according to this invention, the order/structure memory area stores not only the order information but also a combination of the structure information and the item information. Therefore, an order control apparatus according to this invention is capable of reducing input operation of the item information and the structure information by the input unit. That is, the input unit is not always required to input the item information and the structure information in the order control apparatus as a result of this invention.

What is claimed is:

1. An order control apparatus comprising:
   an item information memory area for storing product item information records concerning plural individual product items, each said product information record comprising:
   (i) a field for storing a product identification identifying one of said individual product items and
   (ii) a field for storing the value of a manufacturing feature of said one of said individual product items;
   a structure information memory area for storing product structure information records, each of said product structure information records comprising:
   (i) a field for a parent product identification identifying one of said individual product items,
   (ii) a field for storing a component item identification identifying a component sub-part of said one of said individual product items identified by said parent product identification, and
   (iii) a field for storing structure information relating to said component sub-part;
   an order/structure memory area;
   a control section connected to said item information memory area, said structure information memory area, and said order/structure memory area, so that when said control section is supplied with order information in the form of:
   (i) an order number representing a product order and
   (ii) an ordered item number of said product order in the form of said product identification identifying one of said individual product items, said order number and said ordered item number are stored in said order/structure memory area as a current order number, in a order number field, and a current ordered item number, in a item number field, in a first record,
   said control section further, first, reading from said item information memory area, said value of a manufacturing feature of said record whose said field for storing a product identification corresponds to said current ordered item number and second, storing said value of a manufacturing feature in said order/structure memory area as current item information in said first record, said control section further, first, locating from said structure information memory area each record whose said field value for parent product identification corresponds to said current ordered item number and reading from each said record said component item identification identifying a component sub-part of said current ordered item number, and second, storing in said order/structure memory area each said component item identification identifying a component sub-part of said current ordered item number, in said item number field, and storing said current order number in a parent order number field, of further records; and an order developing section connected to said order/structure memory area for developing said current item information and said item number field information into manufacture instruction information.

2. The order control apparatus of claim 1, further comprising an input unit for inputting said order number and said ordered item number to said control section.

3. The order control apparatus of claim 2, wherein said control section upon failing to locate from said item information memory area any record whose said field for product identification corresponds to said current ordered item number, first, queries said input unit for input of item information corresponding to said current ordered item number, second, stores in said item information memory area said current ordered item number and said item information, and third, stores in said order/structure memory area said item information of said current ordered item number.

4. The order control apparatus of claim 2, wherein said control section upon failing to locate from said structure information memory area any record whose said field value for parent product identification corresponds to said current ordered item number, searches said order/structure memory area for previously stored information concerning said current item number and upon locating a previous record containing said current item number, utilizes said previous record's order number field value as a search key of said parent order number field, and upon locating records whose parent order number field value corresponds to said previous record's order number field, transcribes into said order/structure memory area located component item identification identifying a component sub-part of said current ordered item number, in said item number field, and storing said current order number in a parent order number field, of further records.

5. The order control apparatus of claim 4, wherein said control section upon failing to locate from said structure information memory area any record whose said field value for parent product identification corresponds to said current ordered item number, first, queries said input unit for input of said component item identification identifying a component sub-part of said current ordered item number, and second, stores in said order/structure memory area said component item identification identifying a component sub-part of said current ordered item number, in said item number field, and storing said current order number in a parent order number field.

6. An order control apparatus comprising:

an item information memory area for storing product item information records concerning plural individual product items, each said product information record comprising:

(i) a field for storing a product identification identifying one of said individual product items and (ii) a field for storing lead time for said one of said individual product items;

a structure information memory area for storing product structure information records, each of said product structure information records comprising:

(i) a field for a parent product identification identifying one of said individual product items, (ii) a field for storing a component item identification identifying a component sub-part of said one of said individual product items identified by said parent product identification, and (iii) a field for storing structure information relating to the unit number of said component sub-parts required in assembling said one of said individual product items;

an order/structure memory area;

a control section connected to said item information memory area, said structure information memory area, and said order/structure memory area, so that when said control section is supplied with order information in the form of:

(i) an order number representing a product order and (ii) an ordered item number of said product order in the form of said product identification identifying one of said individual product items, said order number and said ordered item number are stored in said order/structure memory area as a current order number, in a order number field, and a current ordered item number, in a item number field, in a first record, said control section further, first, reading from said item information memory area, said lead time field value of said record whose said field for storing a product identification corresponds to said current ordered item number and second, storing said lead time value in said order/structure memory area as current lead time in said first record, said control section further, first, locating from said structure information memory area each record whose said field value for parent product identification corresponds to said current ordered item number and reading from each said record said component item identification identifying a component sub-part of said current ordered item number, and second, storing in said order/structure memory area said component item identification identifying a component sub-part of said current ordered item number, in said item number field, storing the unit number of said component sub-parts required in assembling said current ordered item number as current unit amounts, and storing said current order number in a parent order number field, of further records; and an order developing section connected to said order/structure memory area for developing said current lead time and said current unit amounts into a required total, a due date, and a scheduled start date for each of said component items for storage and as manufacture instruction information.

7. The order control apparatus of claim 6, further comprising an input unit for inputting said order number and said ordered item number to said control section.

8. The order control apparatus of claim 7, wherein said control section upon failing to locate from said item information memory area any record whose said field for product identification corresponds to said current ordered item number, first, queries said input unit for input of lead time corresponding to said current ordered item number, second, stores in said information memory area said current ordered item number and said lead time, and third, stores in said order/structure memory area said lead time of said current ordered item number.

9. The order control apparatus of claim 7, wherein said control section upon failing to locate from said structure information memory area any record whose said field value for parent product identification corresponds to said current ordered item number, searches said order/structure memory area for previously stored information concerning said current item number and upon locating a previous record containing said current item number, utilizes said previous record's order number field value as a search key of said parent order number field, and upon locating records whose parent order number field value correspond to said previous record's order number field, transcribes into said order/structure memory area located component item identification identifying a component sub-part of said current ordered item number, in said item number field, current unit amounts, and storing said current order number in a parent order number field, of further records.

10. The order control apparatus of claim 9, wherein said control section upon failing to locate from said structure information memory area any record whose said field value for parent product identification corresponds to said current ordered item number, first, queries said input unit for input of said component item identification identifying a component sub-part of said current ordered item number and said current unit amounts, second, stores in said order/structure memory area said component item identification identifying a component sub-part of said current ordered item number, in said item number field, said current unit amounts, and storing said current order number in a parent order number field, and third, stores in said structure information memory area said current ordered item number as a parent product identification, said component item identification, and said current unit amounts.

* * * * *